United States Patent [19]
Simmons

[11] Patent Number: 5,399,309
[45] Date of Patent: Mar. 21, 1995

[54] TAPE WRAPPED, FABRIC REINFORCED, FLEX BEARING

[75] Inventor: Brian Simmons, Gilroy, Calif.

[73] Assignee: Thiokol Corporation, Ogden, Utah

[21] Appl. No.: 807,626

[22] Filed: Dec. 11, 1985

[51] Int. Cl.[6] .......................... F16C 27/06; B29C 27/00
[52] U.S. Cl. ................................. 264/257; 285/235; 384/221
[58] Field of Search ............... 384/221; 264/257, 136; 267/57.1 R, 152; 403/203; 285/223, 235; 464/59, 92; 416/134 R, 141

[56] References Cited

U.S. PATENT DOCUMENTS

| | | | |
|---|---|---|---|
| 1,205,345 | 11/1916 | Hatfield | 264/136 |
| 2,995,907 | 8/1961 | Orain | 464/59 |
| 3,390,899 | 7/1968 | Herbert et al. | 403/203 |
| 3,504,903 | 4/1970 | Irwin | 285/223 |
| 3,504,904 | 4/1970 | Irwin et al. | 285/223 |
| 3,860,134 | 1/1975 | Kobalter | 285/235 |
| 3,941,433 | 3/1976 | Dolling et al. | 384/221 |
| 4,263,243 | 4/1981 | Wilson et al. | 384/221 |
| 4,435,097 | 3/1984 | Peterson | 384/221 |
| 4,570,979 | 2/1986 | Moore | 285/223 |
| 4,582,660 | 4/1986 | Tassone | 264/136 |

*Primary Examiner*—David H. Brown
*Attorney, Agent, or Firm*—Madson & Metcalf

[57] ABSTRACT

A flexible bearing for a rocket motor is constructed by forming a relatively very thin coating (about 0.01 inches thick) of an elastomer such as natural rubber on one surface at least of an equally thin continuous reinforcement strip of pliable fabric, and wrapping the coated fabric strip about an axis of rotation with a multiplicity of turns to form a laminated component comprising a continuous helical coil having aligned edges defining the transverse width thereof and having spaced top and bottom surfaces, the function of the reinforcement strip being containment of the elastomer, whereby a laminated helical coil, and hence, flexible bearing, with a given amount of elastomer contained therein for shearing, is produced with a substantially reduced dimension between the bearing top and bottom surfaces.

20 Claims, 1 Drawing Sheet

TAPE WRAPPED, FABRIC REINFORCED, FLEX BEARING

BACKGROUND OF THE INVENTION

1. Field of the Invention

The present invention relates to flexible bearings and, more particularly, to improvements in continuous strip type flexible bearings and a method for making such bearings.

2. Description of the Prior Art

Flexible bearings made up of a plurality of alternate layers of rigid reinforcements and elastomeric pads are known in the prior art. Such bearings are disclosed in a number of U.S. Patents, as follows: U.S. Pat. No. 2,995,907 to M. Crain; U.S. Pat. No. 3,071,422 to W. L. Hinks; U.S. Pat. No. 3,390,899 to J. T. Herbert et al.; U.S. Pat. No. 3,429,622 to R. E. Lee et al.; U.S. Pat. No. 3,690,639 to W. D. Brandon et al.; U.S. Pat. No. 3,941,433 to W. T. Dolling et al.; U.S. Pat. No. 3,958,840 to C. C. Hickox et al.; U.S. Pat. No. 4,108,508 to R. L. Clinard, Jr.; U.S. Pat. No. 4,141,950 to A. R. Thompson; and U.S. Pat. No. 4,349,184 to R. R. Peterson.

When applied to thrust nozzles for solid propellant rocket motor nozzles, flexible bearings incorporating alternate layers of metal reinforcement and elastomer, irrespective of whether concentrically or spirally arranged, are commonly quite thick in order to contain enough elastomer to provide stable and controllable vectoring of the nozzle through shear deformation of the elastomer. Because of the tendency of thick layers of elastomer to be extruded between the metal reinforcement layers, the elastomer, conventionally, is divided into a large number of thin layers. This necessitates the use of a similarly large number of reinforcement metal layers which has added, undesirably, to the height and weight of the bearing.

Such an approach becomes less and less acceptable as the technology involved in the construction of rocket motors, particularly, advances and produces demands in terms of smaller size, specifically, decreased height and less weight, for flexible bearings capable of providing stable and controllable vectoring of the nozzle for steering the rocket.

In order to minimize flexible bearing height and weight, it is also known in the prior art to utilize therein lightweight, strong, thin, molded composite reinforcements. Structural requirements and manufacturing limitations for composite reinforcements, however, preclude the design of flexible bearings that truly operate at their ultimate capability. Present rocket motor nozzle configurations result in a compressive circumferential load that must be carried by the bearing and supporting structure. Thus, reinforcements have always had compressive stiffness and strength requirements. The present minimum thickness limit for composite reinforcements that meets the structural requirements has exceeded the limits of cost effective manufacturing, as evidenced by an unacceptable composite reinforcement rejection rate. Molded composite reinforcements are susceptible to voids, delaminations, and contamination.

Thus, there is a need and a demand for improvement in flexible bearings and the methods for making such bearings to the end of enabling minimization of bearing height and weight for a given amount of elastomer for shearing. The present invention was devised to fill the technological gap that exists in this respect.

SUMMARY OF THE INVENTION

An object of the present invention is to provide an improved method of making flexible bearings.

Another object of the invention is to provide an improved method of making flexible bearings in order to enable the achievement of a significant reduction in bearing height and weight.

A further object of the invention is to provide an improved reinforced flexible bearing of minimum height and weight for a given amount of elastomer available for shearing.

In accomplishing these and other objectives of the invention, reinforcement structural requirements of the flexible bearing are reduced such that compressive circumferential loads are carried by the supporting structure. A significant reduction in bearing size and weight can then be achieved by using thin pliable fabric for the reinforcement. The only function, then, of the reinforcement is containment of the elastomer. Thus, the fabric reinforced flexible bearing according to the present invention may comprise a laminated component with a shape that readily lends itself to tape wrapping. The tape wrapping operation may comprise painting natural rubber having good elastic properties on the fabric, which may be bias cut, or including the fabric in a calender operation prior to actual layup.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this summary of the invention, a detailed description follows with reference being made to the accompanying drawings which form part of the specification, of which.

DESCRIPTION OF THE PREFERRED EMBODIMENT

The method of making a flexible bearing, according to the present invention, includes a first step of painting a thin coating 10 of an elastomer, for example, natural rubber of good elastic properties, on a substantially equally thin reinforcement strip 12 of pliable fabric, as described hereinafter, having opposed faces that have longitudinal and transverse dimensions. The fabric may be bias cut, or included in a calender operation, as described hereinafter by reference to FIG. 5, prior to the actual layup. By way of example and not limitation, it is noted that the coating 10 of elastomer, and the reinforcement strip 12 also, may be 0.01 inches (0.254 mm.) thick. The step of coating the fabric strip 12 with the elastomer is followed by a second step of wrapping the coated strip on a suitable form or mandrel 14 to the configuration desired for the bearing.

Figure 1:
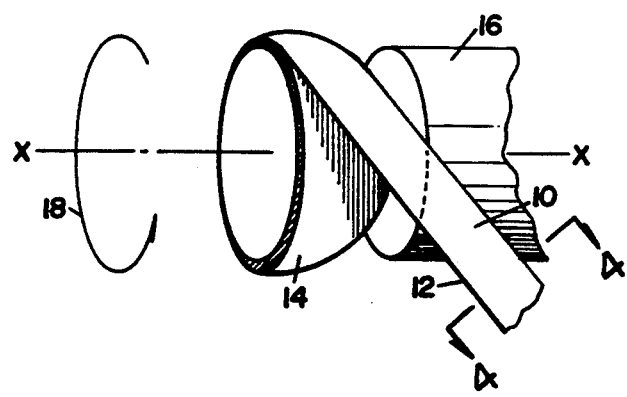
FIG. 1 is a fragmented perspective view illustrating the wrapping of a fabric reinforcement strip to form a flexible bearing according to the invention.
Figure 3:
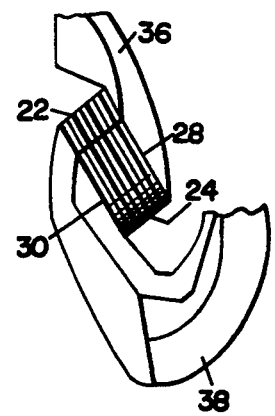
FIG. 3 is a cross section taken on the line 3—3 of FIG. 2, plus mounting rings.
Figure 2:
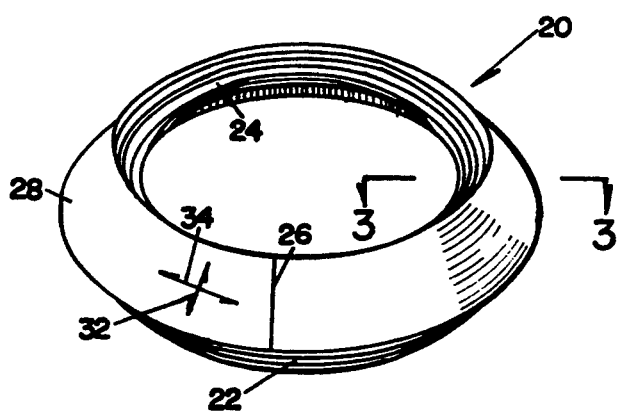
FIG. 2 is a perspective view of a fabric reinforcement strip wrapped flexible bearing according to the invention.

Thus, as illustrated in FIG. 1, a thin continuous reinforcement strip 12 of pliable fabric, having an equally thin coating of natural rubber 10 on at least one side thereof, is wrapped around form or mandrel 14 which is rotated about an axis of rotation X—X by a shaft 16. Shaft 16 is driven in a counterclockwise direction, as indicated by arrow 18, by suitable means (not shown). The resulting bearing 20 that is produced, as shown in FIGS. 2 and 3, is a laminated component comprising a continuous helical coil having aligned edges 22 and 24, with an end 26 on the top surface 28 thereof and an opposed end (not shown) on the bottom surface 30. The distance between the top surface 28 and bottom surface 30 of the bearing 20 is referred to herein as the "height" of the bearing.

The shape of the form 14 on which the strip 12 is wrapped is such that the top surface 28 and the bottom surface 30 of the bearing 20 are enabled to withstand a combination of axially applied and radially applied loads, with the bearing 20 withstanding such loads while yielding to forces applied in the direction of the arrows 32 and 34. That is to say, each layer of elastomer between the top surface 28 and the bottom surface 30 of the laminated coil or bearing 20 are substantially incompressible to forces applied normally to the opposed faces of the reinforcement strip 12 but yielding to forces applied transversely to said faces whereby adjacent face surfaces of the laminated coil 20 may shift transversely in shearing relationship relatively to each other while the spacing between the opposed surfaces is maintained substantially constant by the layer of elastomer. The function of the reinforcement strip thus is one of containment of the elastomer.

The embodiment of the invention shown in FIGS. 2 and 3 has particular, although not exclusive, application for use as a flexible bearing or joint between the case of a solid propellant rocket motor and a movable, that is, rockable thrust nozzle therefor. As such, it is annular in form, with the top and bottom surfaces thereof conforming to the surfaces of concentric spheres, so that the thrust nozzle (not shown) of the rocket motor may be rotated about a fixed point on the bearing axis. This enables stable and controllable vectoring of the rocket motor nozzle for precision steering of the rocket. As shown in FIG. 3, the top and bottom layers 28 and 30 of bearing 20 may be bonded directly to adjacent parts, such as a thrust-nozzle mounting ring 36 and a rocket-case mounting ring 38.

Figure 4:
FIG. 4 is an enlarged cross section, taken along the lines 4—4 of FIG. 1, showing a detail of the fabric reinforcement strip.

In accordance with the invention, the pliable fabric reinforcement strip 12 may comprise a refractory, for example, fiber glass cloth or a carbon cloth. The cloth may have an open weave with interlocked strands, as illustrated in FIG. 4. Another useful material for the fabric of strip 12 is a plastic net made of nylon, polypropylene, polyethylene, polyvinylchloride, Teflon, etc. The use of such a fabric or cloth provides sufficient strength to enable the fabric to contain and thereby maintain dimensional stability of the natural rubber or other elastomer that is used under heavy loads that may be imposed upon the bearing 20 by the propulsive gases of the solid propellant rocket motor, in combination with stresses introduced by hydraulic or other actuators during vectoring of the rocket motor nozzle.

As mentioned hereinbefore, the layer 10 of elastomer may be painted on the surface of the pliable reinforcement plastic strip 12 as by the application with a brush of natural rubber or other elastomer of suitable consistency. Alternatively, the layer 10 of elastomer may be applied to the fabric from which the reinforcement strip 12 is cut during a calendering operation, as illustrated in FIG. 5.

Figure 5:
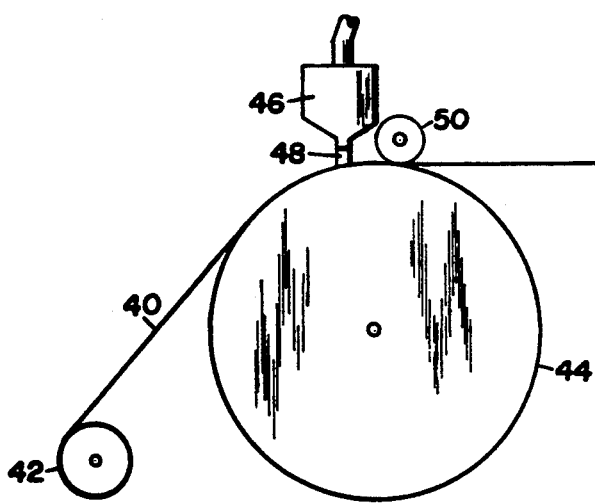
FIG. 5 is a schematic illustration of a calendering operation for applying a thin coating of elastomer to the fabric and the bias cutting thereof into a plurality of coated reinforcement strips.

As shown in FIG. 5, a pliable fabric sheet 40 is drawn from a supply thereof comprising a suitably mounted roll 42 thereof and passed over a heated calender roll 44. Associated with the calender roll 44 and suspended above it is a nozzle 46 through which elastomer 48 is forced under pressure from a supply thereof (not shown). A roll 50, which may be made of Teflon (tetrafluoroethylene) is rotatably mounted in contact with the surface of the fabric sheet 40 and the surface of roll 44. Roll 50 is held under constant contact pressure for spreading the elastomer in a uniformly thin coat over the surface of the fabric sheet 40. If desired, suitable scraping means (not shown) may be provided to remove excess elastomer. Cutting means for cutting the coated fabric sheet 40 into individual reinforcement strips are shown at 52. The cut reinforcement strips are shown as being wound up on take up rolls 54, 56, 58, etc.

A feature of the present invention is that during wrapping of the elastomer coated continuous reinforcement strip 10, the elastomer extrudes through the openings in the weave and encapsulate the strands of the woven fabric. This produces a multiplicity of threads of elastomer that pass through each wrap of the strip 10. With the elastomer so extending throughout the height of the bearing 20, the only function of the continuous reinforcement strip 10 is containment of the elastomer in the bearing 20. As a result, with a strip or tape wrapped reinforced bearing, a significantly greater amount of elastomer is available for shearing for a given height of the bearing than is possible with state-of-the-art flex bearings utilizing composite or other known reinforcements.

By way of example, it is noted that a typical state-of-the-art flexible bearing that is 1.60 inches (4.064 cm.) in total height could be constructed with thirteen 0.080 inch (2.032 mm.) thick composite reinforcements. A strip wrapped fabric reinforced flexible bearing, made according to the present invention, with the same amount of rubber available for shearing could be constructed having a total height of only 1.11 inches (2.82 cm.)—a very significant reduction of 31% in bearing size.

Thus, in accordance with the invention, there has been provided an improved method of making flexible bearings that enable the achievement of a significant reduction in bearing height and weight. There has also been provided an improved flexible bearing of minimum height and weight for a given amount of natural rubber or other elastomer for shearing.

With this description of the invention in detail, those skilled in the art will appreciate that modifications may be made to the invention without departing from its spirit. Therefore, it is not intended that the scope of the invention be limited to the specific embodiments illustrated and described. Rather, it is intended that the scope of this invention be determined by the appended claims and their equivalents.

What is claimed is:

1. A method of making a flexible bearing usable between a rocket motor case and a movable thrust nozzle therefor, the method comprises coating a layer of elastomer onto at least one face of an elongated pliable fabric reinforcement strip having opposed faces that have longitudinal and transverse dimensions, and wrapping the coated fabric reinforcement strip around an axis of rotation on a form the surface configuration of at least a portion of which is spherical with a multiplicity of turns thereby providing spaced surfaces of the flexible bearing for bonding between the case and nozzle respectively which conform to the surfaces of concentric spheres whereby the thrust nozzle may be rotated about a fixed point on the bearing axis to enable stable and controllable vectoring of the thrust nozzle for precision steering of the rocket and such that the turns of coated pliable fabric reinforcement strip are generally parallel to said spaced surfaces whereby the layer of elastomer is substantially incompressible to forces applied normal to the opposed faces of the reinforcement strip but yields to forces applied transversely to the opposed faces whereby adjacent face surfaces may shift transversely in shearing relationship relative to each other while the spacing therebetween may be maintained substantially constant by the layer of elastomer.

2. A method as set forth in claim 1 wherein the thickness of each of said reinforcement strip and said layer of elastomer is about 0.01 inches (0.0254 cm.).

3. A method as set forth in claim 1 wherein said layer of elastomer is painted on said reinforcement strip.

4. A method as set forth in claim 1 wherein said layer of elastomer is applied to said reinforcement strip in a calender operation.

5. A method as set forth in claim 1 wherein said reinforcement strip is made of carbon cloth.

6. A method as set forth in claim 1 wherein said reinforcement strip is a woven plastic.

7. A method as set forth in claim 1 wherein said layer of elastomer is made of natural rubber.

8. A method according to claim 1 further comprises selecting the fabric for the reinforcement strip to have an open weave whereby the coating may extend through openings in the weave to encapsulate the strands thereof.

9. A method as set forth in claim 1 wherein said reinforcement strip is made of a refractory cloth.

10. A method as set forth in claim 9 wherein said refractory cloth is fiber glass.

11. A flexible bearing for use between a rocket motor case and a movable thrust nozzle therefor, the flexible bearing comprises an elongated pliable fabric reinforcement strip which has opposed faces that have longitudinal and transverse dimensions and which is wrapped around an axis of rotation with a multiplicity of turns, a coating of elastomer on at least one of said opposed faces, and means including spaced surfaces for mounting the coated and wrapped pliable reinforcement strip between the rocket motor case and the movable thrust nozzle, said spaced surfaces generally conform to the surfaces of concentric spheres whereby the thrust nozzle may be rotated about a fixed point on the bearing axis to enable stable and controllable vectoring of the thrust nozzle for precision steering of the rocket, and the turns of coated fabric reinforcement strip are generally parallel to said spaced surfaces whereby the layer of elastomer is substantially incompressible to forces applied normal to the opposed faces of the reinforcement strip but yields to forces applied transversely to the opposed faces whereby adjacent face surfaces may shift transversely in shearing relationship relative to each other while the spacing therebetween may be maintained substantially constant by the layer of elastomer.

12. A flexible bearing as defined by claim 11 wherein said reinforcement strip is a carbon cloth.

13. A flexible bearing as defined by claim 11 wherein said reinforcement strip is a woven plastic.

14. A flexible bearing as defined by claim 11 wherein said elastomer is made of natural rubber.

15. A flexible bearing as defined by claim 11 wherein the thickness of each of said reinforcement strip and said layer of elastomer is about 0.01 inches (0.0254 cm.).

16. A flexible bearing as defined by claim 15
   wherein said reinforcement strip is a woven plastic, and
   wherein said layer of elastomer is a coating of natural rubber.

17. A flexible bearing as defined by claim 11 wherein said reinforcement strip is a refractory cloth.

18. A flexible bearing as defined by claim 17 wherein said refractory cloth is fiber glass.

19. A flexible bearing as defined by claim 11 wherein the fabric of said reinforcement strip throughout the length thereof has an open weave whereby said coating may extend through the openings in the weave to encapsulate the strands thereof.

20. A flexible bearing as defined by claim 19 wherein intersecting strands of the reinforcement strip are attached to each other at the intersections thereof.

* * * * *